(12) United States Patent
Moore et al.

(10) Patent No.: US 6,253,244 B1
(45) Date of Patent: Jun. 26, 2001

(54) SYSTEM AND COMPUTER-IMPLEMENTED METHOD FOR PROVIDING ACCESS TO HOST-BASED SCREEN APPLICATIONS USING BUSINESS-CENTRIC SOFTWARE COMPONENTS

(75) Inventors: Jeffrey Allen Moore, Mission Viejo; Shelby Kiyee Seid, Los Angeles; Joseph Peter Stefaniak, San Clemente, all of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/183,203

(22) Filed: Oct. 30, 1998

(51) Int. Cl.[7] ........................................ G06F 15/16
(52) U.S. Cl. ........................ 709/231; 709/203; 709/219
(58) Field of Search ................................. 709/231, 232, 709/203, 217–219

(56) References Cited

U.S. PATENT DOCUMENTS

| | | | |
|---|---|---|---|
| 5,627,979 | * | 5/1997 | Chang et al. ..................... 707/104 |
| 5,708,828 | * | 1/1998 | Coleman .......................... 707/523 |
| 5,727,175 | * | 3/1998 | Malone et al. ................... 345/356 |
| 5,815,149 | * | 9/1998 | Mutschler, III et al. .......... 709/245 |
| 5,956,725 | * | 9/1999 | Burroughs et al. ............... 707/101 |
| 5,974,430 | * | 10/1999 | Mutschler, III et al. .......... 707/505 |
| 6,061,516 | * | 5/2000 | Yoshikawa et al. ................. 717/2 |

* cited by examiner

*Primary Examiner*—Ayaz Sheikh
*Assistant Examiner*—Philip Tran
(74) *Attorney, Agent, or Firm*—Alfred W. Kozak; Mark T. Starr; Lise A. Rode

(57) ABSTRACT

A method in a computer system, having a client, a server and a host, is disclosed which provides access to host-based legacy screen applications. The method includes the steps of receiving a stream of data representative of the legacy screen application from the host in response to a request by the client for data fields. Next, the data stream is parsed into its constituent elements. The constituent elements are then matched with a recognition file for the screen application. The results of the preceding step are used for retrieving a type library, which stores field information for the screen application. After this, the constituent elements are associated with data names that are stored in the type library. Finally, field objects are created based on the information retrieved from the type library and stored in the server, thereby providing access to them by the client.

19 Claims, 8 Drawing Sheets

SYSTEM AND COMPUTER-IMPLEMENTED METHOD FOR PROVIDING ACCESS TO HOST-BASED SCREEN APPLICATIONS USING BUSINESS-CENTRIC SOFTWARE COMPONENTS

CROSS REFERENCE TO RELATED APPLICATIONS

This application relates to the following co-pending application, assigned to the same assignee hereof, the texts of which is incorporated herein by reference.

U.S. Ser. No. 09/183,204, entitled A SYSTEM AND COMPUTER-IMPLEMENTED METHOD FOR TRANSFORMING EXISTING HOST-BASED SCREEN APPLICATIONS INTO COMPONENTS USEFUL IN DEVELOPING INTEGRATED BUSINESS-CENTRIC APPLICATIONS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems for developing business applications; and, in particular, it relates to a system and computer-implemented method for providing business-centric application access to existing host-based screen applications.

BACKGROUND OF THE INVENTION

Distributed computing has made possible numerous advancements and opened many opportunities in software industry, from both a client-server and a software modeling perspective. A movement is being made towards network-centric computing, using the client-server architecture and the Internet (coupled with new software tools and component-based models), which affords ease of access and manipulation of business data.

As client-server computing emerged in the early nineties, more advanced software solutions were introduced that have more intelligent links among clients and servers. Although this represents an improvement over earlier models, client-server computing still suffers from a number of drawbacks. For example, since information carried between clients and servers is usually transmitted over a proprietary protocol, each user tends to implement a closed solution; i.e., a solution that works only for the product of that user.

Currently, distributed component-based development and enabling solutions are changing the way information is discovered, built, managed and delivered. Organizations are investing in component-based technologies since they cannot afford to ignore the reductions in costs that this technology offers. As a method for delivering information to large numbers of end-users, the iterative process of building and deploying components that are based on 3GL legacy assets are appealing when compared with the alternative of configuring every end-user system with application-specific client applications.

A reduction in the overall costs is just one benefit. Other benefits include access to larger amounts of enterprise information for connecting the organization, delivering solutions and keeping pace with end-user demands, as well as being able to take advantage of ever changing technology more effectively. Effective business processes require information, and the objective for the Information System (IS) organizations is to ensure that the required information is available when it is needed.

An example of a prior art method is disclosed in U.S. Pat. No. 5,815,149, entitled METHOD FOR GENERATING CODE FOR MODIFYING EXISTING EVENT ROUTINES FOR CONTROLS ON A FORM, by Eugene Mutschler, et al, and assigned to the assignee hereof. This patent teaches a method for converting existing forms of legacy programs into a more modern and widely-used format. The present invention on the other hand, discloses and claims an improvement over what is taught in this patent by rendering those legacy forms into object oriented data format for use in any distributed object oriented business process development framework.

The present invention re-uses existing business assets in new component-based paradigms. It employs a method that enhances the efficiency of the current technology and reduces its drawbacks.

SUMMARY OF THE INVENTION

The method and system of the present invention solves the problems of the prior art by creating several components that are useful for accessing and re-using the assets of an enterprise application (specifically, 3GL screen based applications). The method of the present invention increases the efficiency of a computer system and runtime process by allowing business components to be managed from a centralized location.

It is an object of the present invention to provide a method for supporting component-based runtime environments.

Another object of the present invention is to provide a method for supporting the access of enterprise assets from business components, which, in-turn, can be accessed with the use of the new component model technologies.

Yet another object of the present invention is the provision of a method that supports centralized management by permitting inclusion of the business components into component-based management environments for further run-time monitoring and performance analysis.

A feature of the present invention resides in the provision of procedures that permit the selective access of enterprise assets.

Another feature of the present invention is the capability of allowing administrators to control the runtime process, thereby creating a component-based technology that caters to system needs.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
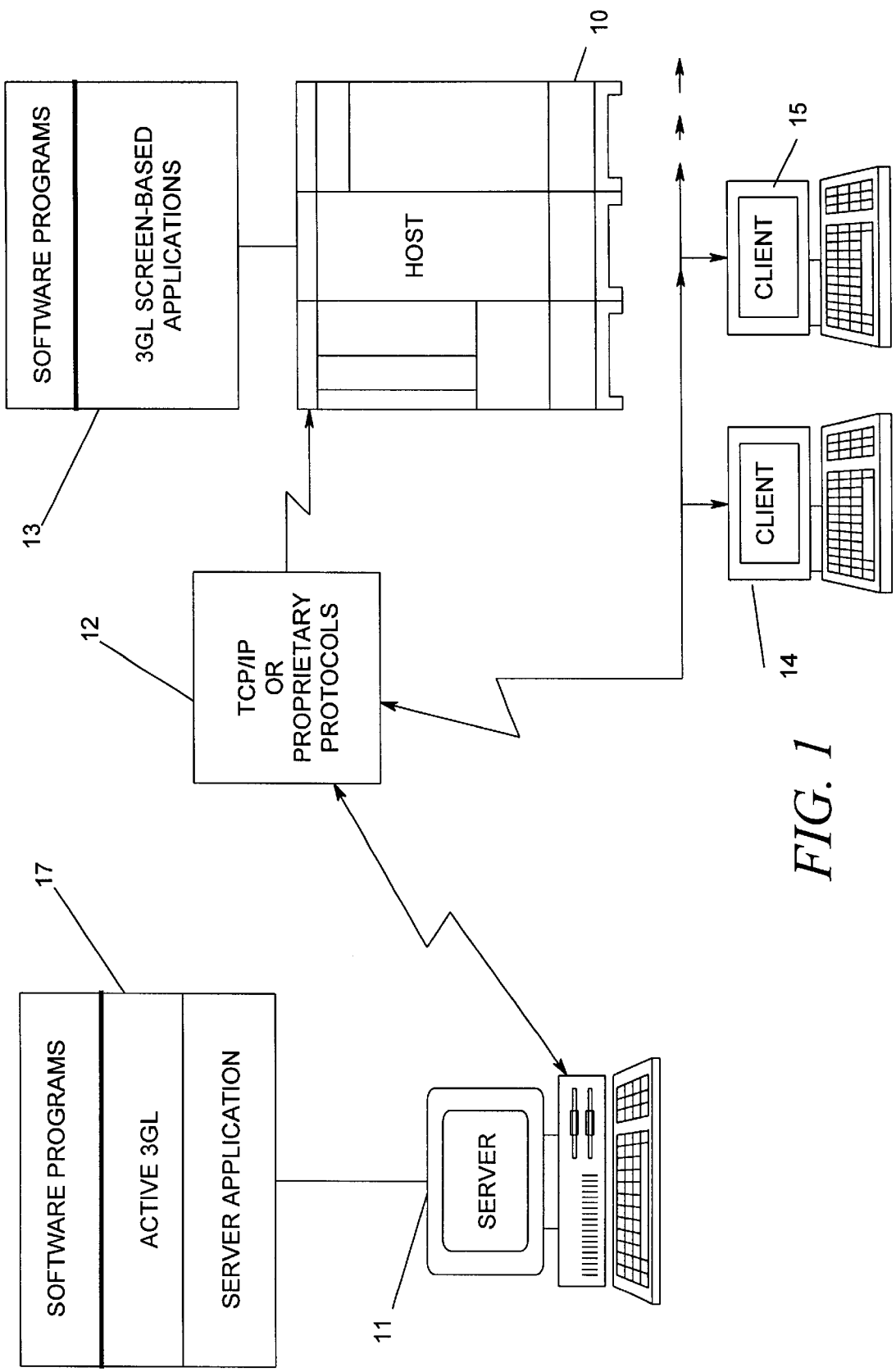
FIG. 1 is a block diagram of a computer system framework which may employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a nonvolatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit-and byte-ordering and the transmission and error detection as well as correction of the bit stream. High-level protocols deal with message formatting, including the syntax of messages, the terminal to computer dialogue, character sets, sequencing of messages, etc.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business-centric software components represents things, processes or events that are meaningful to the conduct of a business. Business objects make sense to business people. More specifically, a business object is a representation of an active thing in the business domain, including at least its business name and definition, attributes, behavior, relationships, rules, policies and constraints; but not including the presentations thereof. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc.

The build phase takes the specifications and creates the implementation. That is, source files or source information is compiled or wrapped in order to create a component that will be used in the runtime system.

Figure 2:
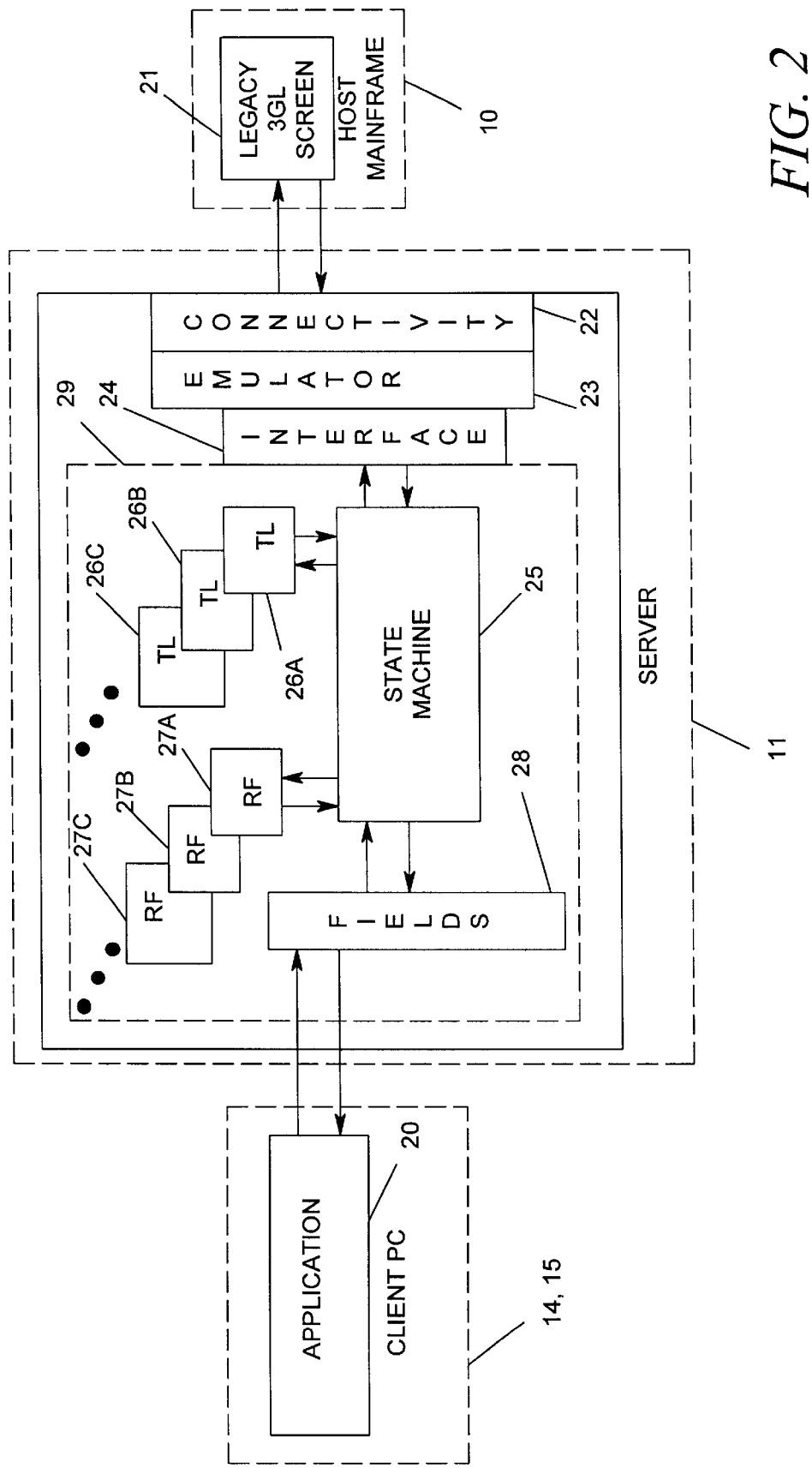
FIG. 2 is a software module block diagram of the method and system of the present invention.

Referring now to FIG. 1, a system configuration is illustrated, including a host, or mainframe, 10 having coupled thereto a server 11 by means of a network, such as TCP/IP or other proprietary protocols 12. Among other programs, the host executes 3GL screen-based applications 13. The server 11 is coupled to clients 14 and 15 by means of the TCP/IP or proprietary protocols 12. The server 11 is capable of executing software programs 17 including active 3GL programs and a server application, such as the MTS (Microsoft Transaction Server) available from Microsoft Corporation of Redmond, WA Referring now to FIG. 2, a block diagram of a particular embodiment of the method and system of the present invention is shown. A multiplicity of software modules are disposed for accessing host-based screen applications from business-centric software components. In the disclosed embodiment, the client PC 14 or 15 is executing an application 20. A legacy 3GL screen 21 is supplied by the host 10 to the server 11 via a connectivity 22, an emulator 23 and an interface 24. The connectivity 22 receives a data stream from the host 10, which may comprise data from an A Series or ClearPath NX computing system available from the assignee hereof, and stores the data for access by the emulator 23. The interface 24 converts the language of the connectivity 22 and the emulator 23 (which may comprise Java Beans) to that compatible with a state machine 25 (which may be written in C++). In other words, the emulator 23 and interface 24 access data stored in the connectivity 22 and puts it into a more meaningful format for use by the state machine 25, which will be amplified hereinafter.

The state machine 25 acts upon data received from the interface 24 and accesses a plurality of type libraries 26a, 26b, 26c, . . . and recognition files 27a, 27b, 27c, . . . in order to create a collection of field objects to be stored in a fields array 28. A type library contains detailed information about each screen, including the position and length at which protected and unprotected fields appear in the emulator screen, as well as a dataname by which a given field may be identified. A recognition file is a flat file used for associating a type library with something recognizable from the host. That is, the recognition file associates a screen object with recognizable text. It contains a list of identifiers for screens, such as an identifier of a type library and recognition criteria for each screen. One recognition file exists for all screens to be recognized by a single application. It is noted that the software modules within the dashed line 29 comprise the server application software alluded to hereinabove.

Figure 3:
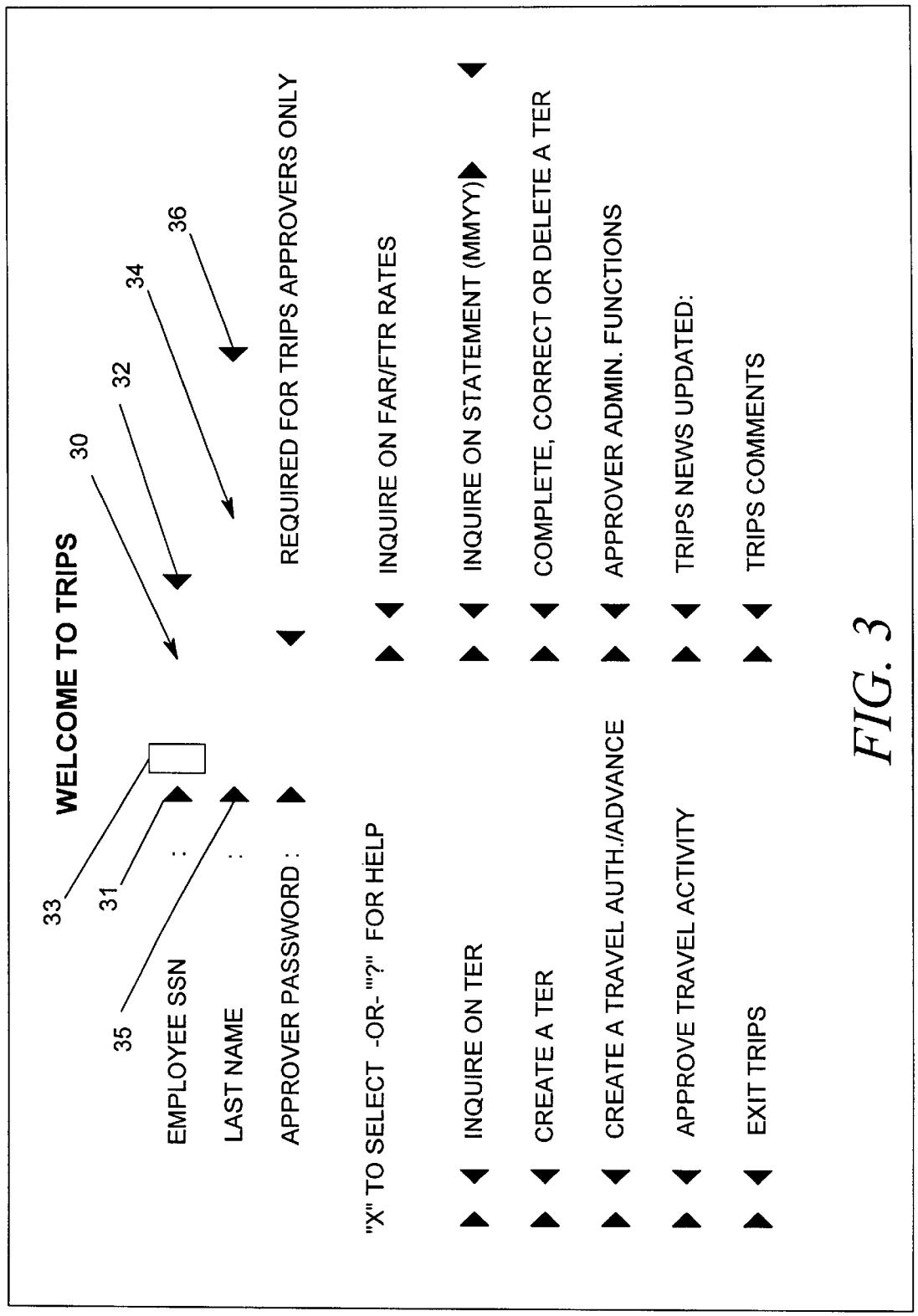
FIG. 3 is a print of a 3GL computer screen display from a MAPPER screen-based application form for TRIPS, a report for tracking employee expenses, which form is convertible by using the method of the present invention.

Referring now to FIG. 3, a print of a screen display of a Form for an exemplary 3GL legacy application is illustrated. When a client user logs onto the server and specifies TRAVEL, this particular Form entitled TRIPS appears on the screen. It is a typical Form to be completed by an employee of an organization for reimbursement of travel expenses. Each field of this Form is depicted by a space between opposing arrowheads. For example, the field entitled EMPLOYEE SSN is that space 30 between opposing arrowheads 31 and 32, and includes a display screen cursor 33. The next field LAST NAME is that space 34 between opposing arrowheads 35 and 36. The remaining fields of the Form are similarly depicted. There are a total of fifteen (15) fields on this Form.

Figure 4:
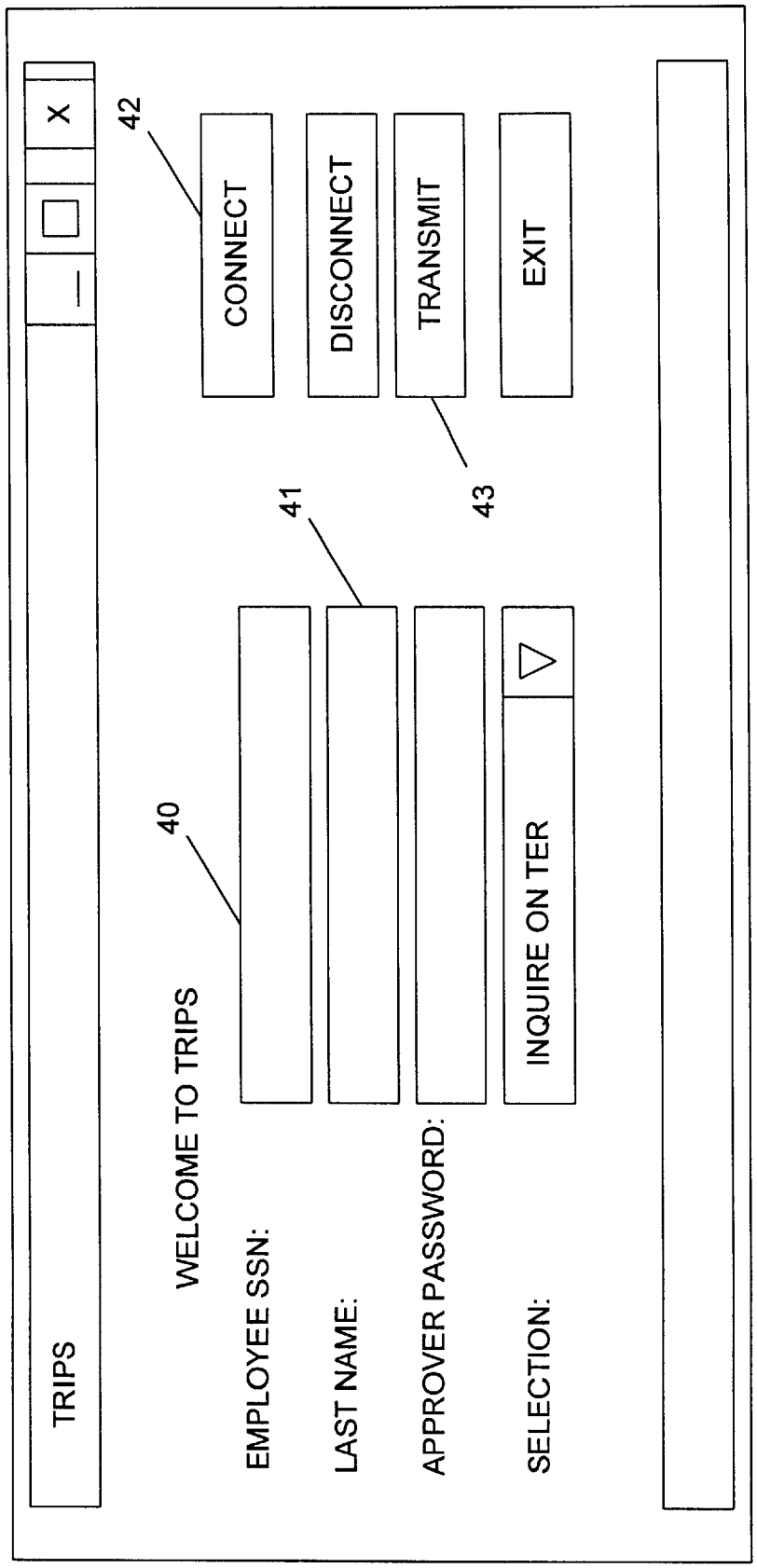
FIG. 4 is a print of a computer screen display from a client PC using the present invention to access the TRIPS application.

Referring now to FIG. 4, a print of a computer screen display from a client PC (e.g., PC 14, 15) using the present invention to access the TRIPS application. Notice that the illustrated client screen is one example of a more meaningful presentation of the data representing the host-based 3GL screen described in FIG. 3. The screen includes windows providing for the display and modification of the data. Window 40 displays the data that corresponds to field 30 in FIG. 3. Window 41 displays the data that corresponds to field 34 in FIG. 3. The CONNECT button 42 provides the user with a means for initiating the process, which will be amplified hereinafter (e.g., block 51, FIG. 5A). The TRANSMIT button 44 provides the user with a means for indicating that the desired fields have been modified and that the server should transmit the new data to the host which will be amplified hereinafter (e.g., block 73, FIG. 5D). The transaction server software (i.e., the server application 29) provides means for the client PC 14, 15 to modify field values on the server (i.e., within fields 28) and call the connect and transmit methods of the state machine 25.

Figure 5A:
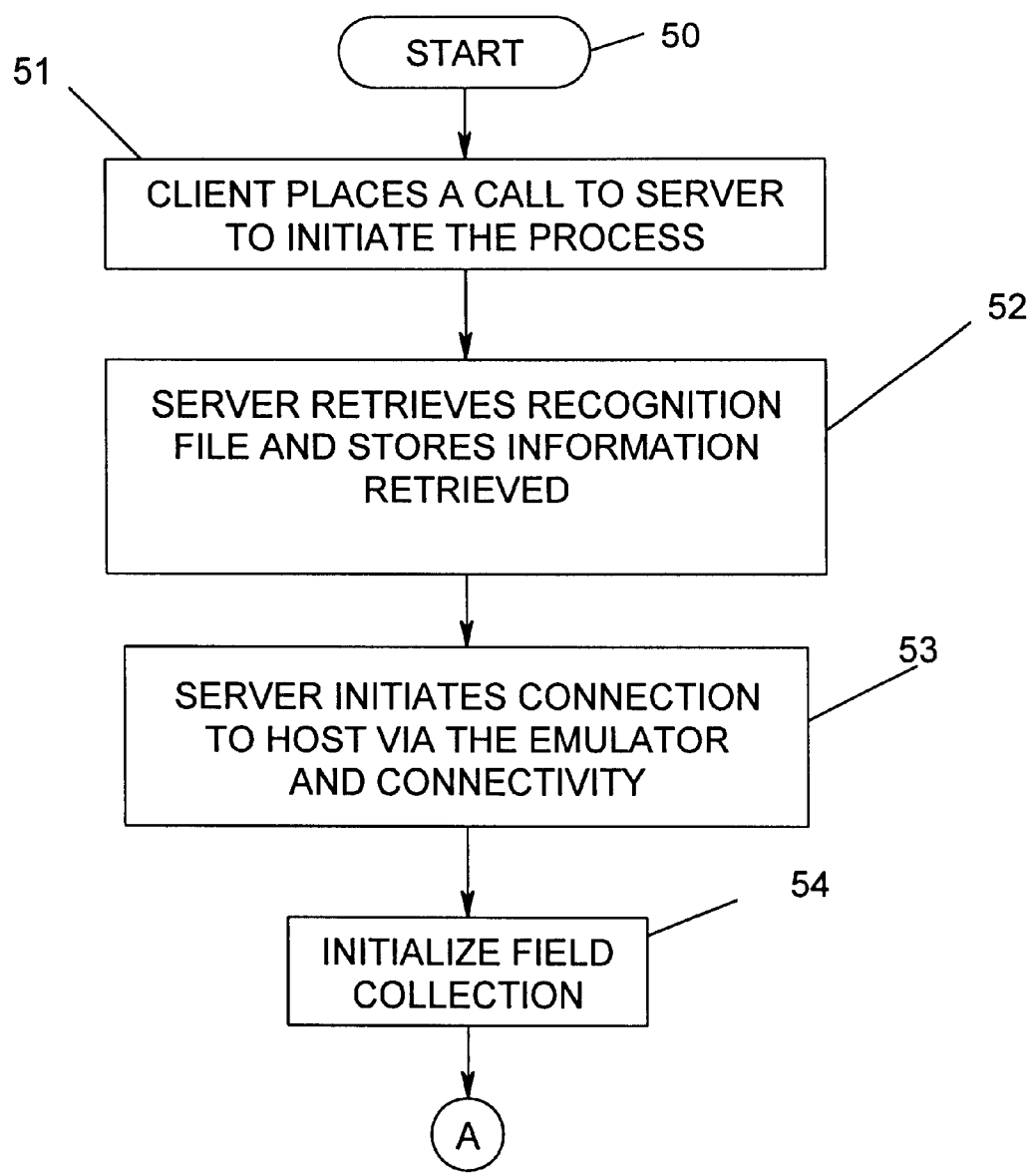
FIGS. 5A through 5D combined form a flow chart of the disclosed embodiment of the present invention.

Referring now to FIG. 5A, the first of a four-sheet drawing of a flow chart of the method of the present invention is shown. The method begins with a start bubble 50 followed by the client placing a call to the server to initiate the process (block 51). Next, the server retrieves a recognition file associated with a 3GL application and stores the information retrieved (block 52) in the system memory. Following this, the server initiates a connection to the host 10 via the emulator 23 and connectivity 22 (block 53) and the field collection (for the fields 28) is initialized (block 54). The process illustration continues in FIG. 5B as denoted by a connector A.

Figure 5B:
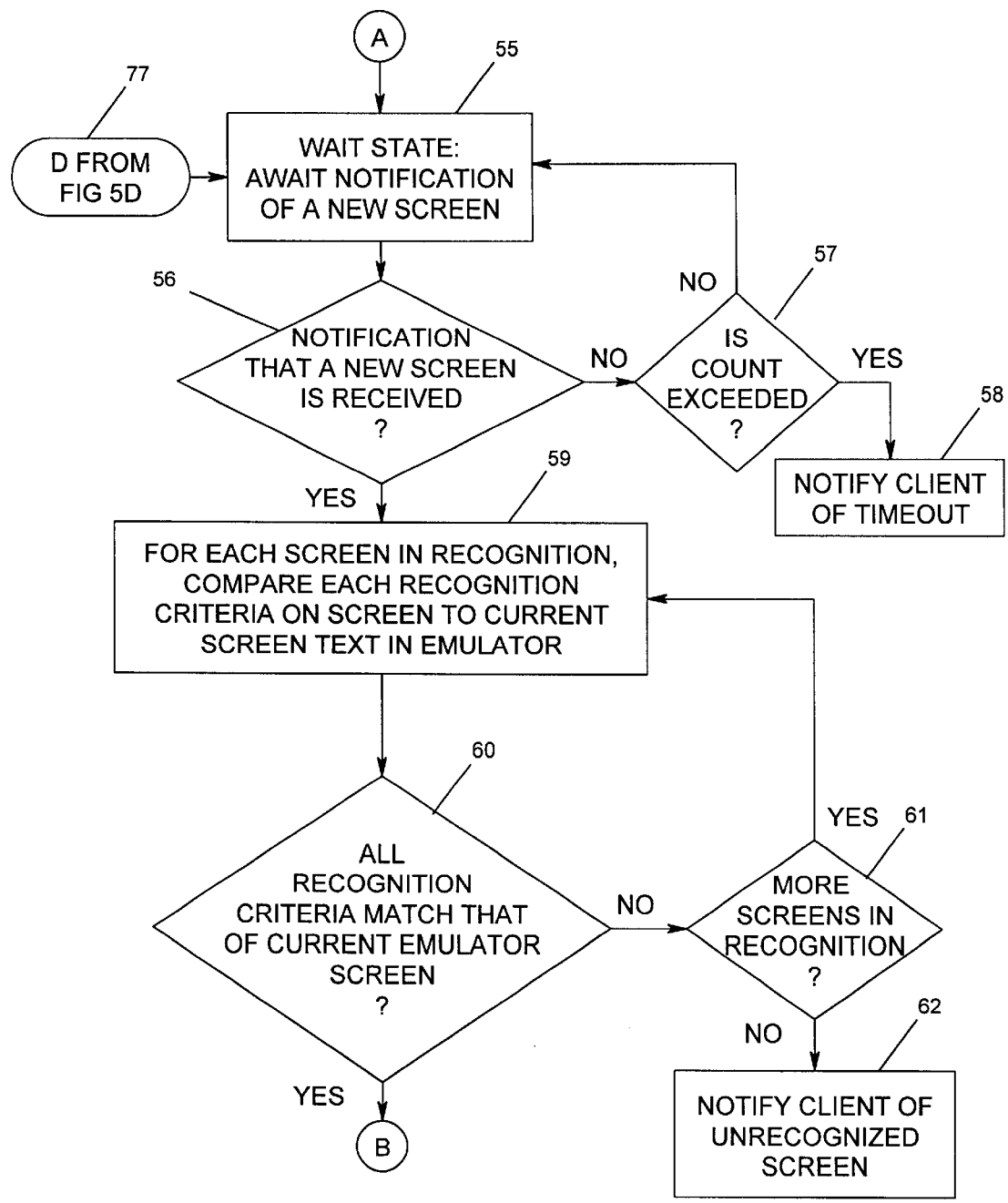

Referring now to FIG. 5B at the connector A, a process wait state occurs while awaiting notification of a new screen (block 55). Following this, an inquiry is made as to whether or not a new screen has been received (diamond 56). If the answer to this inquiry is no, then another inquiry is made as to whether or not a pre-set count is exceeded (diamond 57). If the answer to this inquiry is no, then a return is made to the wait state 55. On the other hand, if the answer to the inquiry is yes, then the client PC 14, 15 is notified of a time out (block 58).

If a new screen has been received, yes answer to the inquiry in the diamond 56, then for each screen in a recognition file, a comparison is made of each recognition criteria of the screen to the current screen text in the emulator 23 (block 59). Next, another inquiry is made as to whether or not all recognition criteria matches that of the current emulator screen (diamond 60). If the answer to this inquiry is no, then yet another inquiry is made as to whether or not there are more screens in the recognition file (diamond 61). If the answer to this latter inquiry is yes, then a return is made back to the block 59 to process the next screen. On the other hand, if the answer to this latter inquiry is no, then the client PC 14, 15 is notified of an unrecognized screen (block 62). If all recognition criteria matches that of the current emulator screen, (yes leg of the diamond 60) then the process illustration continues on the next sheet as denoted by a connector B.

Figure 5C:
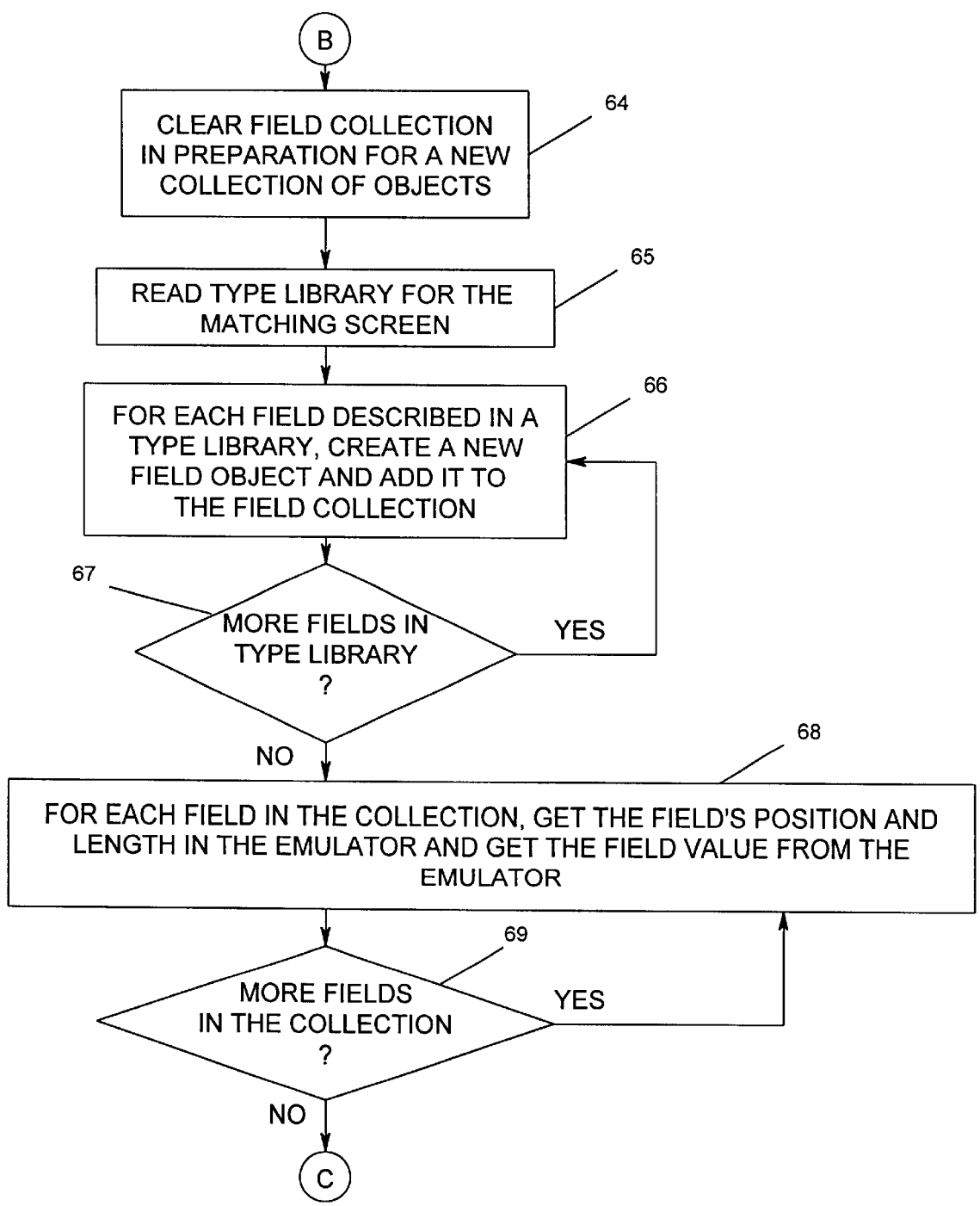

Referring now to FIG. 5C at the connector B, the field collection is cleared in preparation for a new collection of objects (block 64). Next, a type library 26A, 26B, 26C, . . is read for the matching screen (block 65). After this, for each field described in the type library 26A, 26B, 26C, . . . a new field object is created and added to the field collection (block 66).

An inquiry is next made as to whether or not there are more fields in the type library 26A, 26B, 26C, . . . (diamond 67). If the answer to this inquiry is yes, then a return is made back to the block 66 for processing the next field. On the other hand, if the answer to this inquiry is no, then for each field in the collection, the field's position and length in the emulator are used to obtain the field value from the emulator (block 68).

Another inquiry is now made as to whether or not there are more fields in the collection (diamond 69). If the answer to this inquiry is yes, then a return is made back to the block 68 for processing the next field. On the other hand, if the answer to this inquiry is no, then the process illustration continues in FIG. 5D as indicated by a connector C.

Figure 5D:
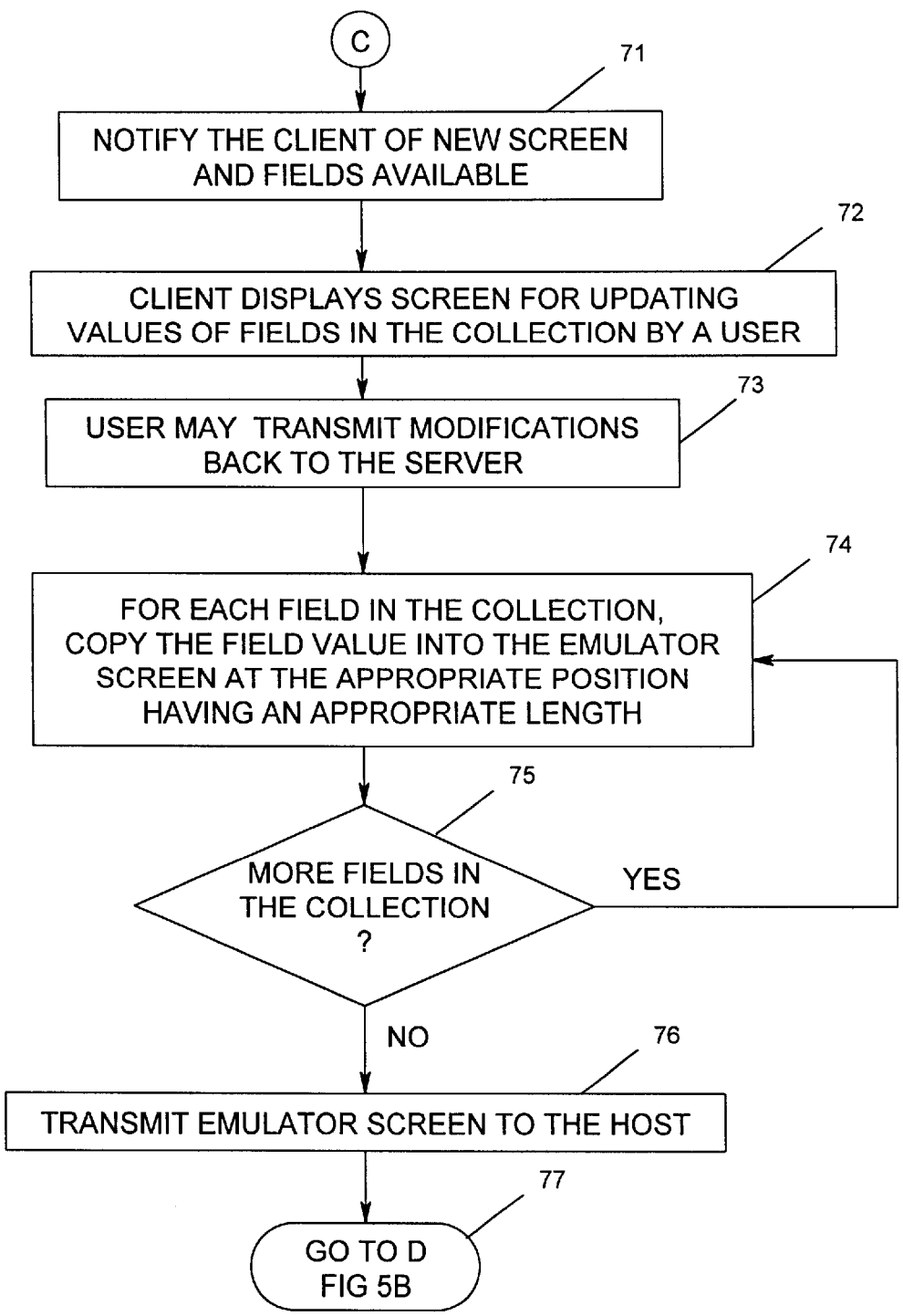

Referring now to FIG. 5D at the connector C, the client is notified that a new screen and fields are available (block 71). The client then displays a relevant screen (e.g., FIG. 4) for presentation and updating of the newly available values of fields in the collection (block 72). After this, the user may transmit back to the server the modifications made to the collection of objects in the field (block 73).

For each field in the collection, the field value is copied into the emulator screen at the appropriate position and with the appropriate length (block 74). An inquiry is next made as to whether or not there are more fields in the collection of objects (diamond 75). If the answer to this inquiry is yes, then a return is made back to the block 74 for processing t he next field. On the other hand, if the answer to this inquiry is no, then presumably the screen is complete and the emulator screen is transmitted to the host (block 76). After this, a return is made back to the block 55 (the wait state, FIG. 5B) as denoted by a connector D (bubble 77).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, where in, when the program code is received and loaded into and executed by a machine, such as a computer, the machine e becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a client, a middle tier server and a host, a method for providing access to a host-based legacy screen application using business-centric software components, said method comprising the steps of:
   a. receiving a first stream of data representative of said legacy screen application from said host in response to a request by said client for data fields;
   b. parsing said first data stream into constituent elements;
   c. matching said constituent elements of said first data stream with a recognition file for said screen application, wherein said recognition file contains information associating said components with said file;
   d. using results of the preceding step for retrieving a type library storing field information for said screen application;
   e. associating said constituent elements with data names that are stored in said type library; and,
   f. creating field objects based on said information retrieved from said type library and storing said field objects in said server thereby providing access thereto by said client, wherein a collection of field objects comprise a business-centric software component.

2. The method as in claim 1, in response to a request by said client to transmit updated values of said field objects to said server, further comprising the steps of:
   a. storing updated values for said field objects received from said client;
   b. retrieving said updated values for each field object stored in said server;
   c. writing each of said updated values into a second data stream based on information stored in said type library; and,
   d. transmitting said second data stream back to said host legacy screen application.

3. The method as in claim 1 further comprising the step of mapping said first data stream into a parsable state, thereby putting said first data stream into a usable format for associating said first data stream with said type libraries stored in said server.

4. The method as in claim 3 wherein said step of parsing further comprises breaking down said first data stream into control characters and text data.

5. The method as in claim 4 further comprising the step of associating said first data stream mapped in accordance with the previous step with a corresponding type library by matching recognition criteria stored in said recognition file with said mapped data stream.

6. The method as in claim 1 wherein said type library contains information comprising screen name, field size, field type (for input/output), field name and field position of an associated data stream, which is used to create said field objects.

7. The method as in claim 6 wherein said field objects contain information comprising name, type, size as defined in said type library and furthermore, associated with text data in said first data stream.

8. A program storage medium readable by a computing system having a storage device, a client, and a middle tier server, said storage medium tangibly embodying a program of instructions executable by said system to perform method steps for providing access to host-based screen applications, said method comprising the steps of:
   a. receiving a first stream of data representative of said legacy screen application from said host in response to a request by said client for data fields;
   b. parsing said first data stream into constituent elements;
   c. matching said constituent elements of said first data stream with a recognition file for said screen application, wherein said recognition file contains information associating said components with said file;
   d. using results of the preceding step for retrieving a type library storing field information for said screen application;

e. associating said constituent elements with data names that are stored in said type library; and, f. creating field objects based on said information retrieved from said type library and storing said field objects in said server, thereby providing access thereto by said client, wherein a collection of field objects comprise a business-centric software component.

9. The program storage medium as in claim 8, in response to a request by said client to transmit updated values of said field objects to said server, further comprising the steps of:

a. storing updated values for said field objects received from said client;

b. retrieving said updated values for each field object stored in said server;

c. writing each of said updated values into a second data stream based on information stored in said type library; and, d. transmitting said second data stream back to said host legacy screen application.

10. The program storage medium as in claim 8 further comprising the step of mapping said first data stream into a parsable state, thereby putting said first data stream into a usable format for associating said first data stream with said type libraries stored in said server.

11. The program storage medium as in claim 10 wherein said step of parsing further comprises breaking down said first data stream into characters and text data.

12. The program storage medium as in claim 11 further comprising the step of associating said first data stream mapped in accordance with the previous step with a corresponding type library by matching recognition criteria stored in said recognition file with said mapped data stream.

13. The program storage medium as in claim 8 wherein said type library contains information comprising screen name, field size, field type (for input/output), field name and field position of an associated data stream, which is used to create said field objects.

14. The program storage medium as in claim 13 wherein said field objects contain information comprising name, type, size as defined in said type library and furthermore, associated with text data in said first data stream.

15. In a computer system having a client, a server and a host, an apparatus disposed for providing access to host-based screen applications, said apparatus comprising;

a. connectivity means for receiving a stream of said legacy screen data from said host in response to a request by said client for data fields;

b. emulator means for parsing said data stream into constituent elements;

c. means for matching said constituent elements of said data stream with a recognition file for said screen application;

d. means for using results of the preceding step for retrieving a type library storing field information for said screen application;

e. means for associating said constituent elements with data names that are stored in said type library; and, f. means for creating field objects based on said information retrieved from said type library and storing said field objects in said server, thereby providing access thereto by said client.

16. The apparatus as in claim 15 further comprising:

a. means for storing updated values for said field objects received from said client;

b. means for retrieving said updated values for each field object stored in said server;

c. means for writing each of said updated values into a second data stream based on information stored in said type library; and, d. means for transmitting said second data stream back to said host legacy screen application.

17. The apparatus as in claim 15 further comprising means for associating said first data stream mapped in accordance with the previous step with a corresponding type library by matching recognition criteria stored in said recognition file with said mapped data stream.

18. The apparatus as in claim 15 wherein said type library contains information comprising screen name, field size, field type (for input/output), field name and field position of an associated data stream, which is used to create said field objects.

19. The method as in claim 15 wherein said field objects contain information comprising name, type, size as defined in said type library and furthermore associated with text data in said first data stream.

* * * * *